Figure 1:
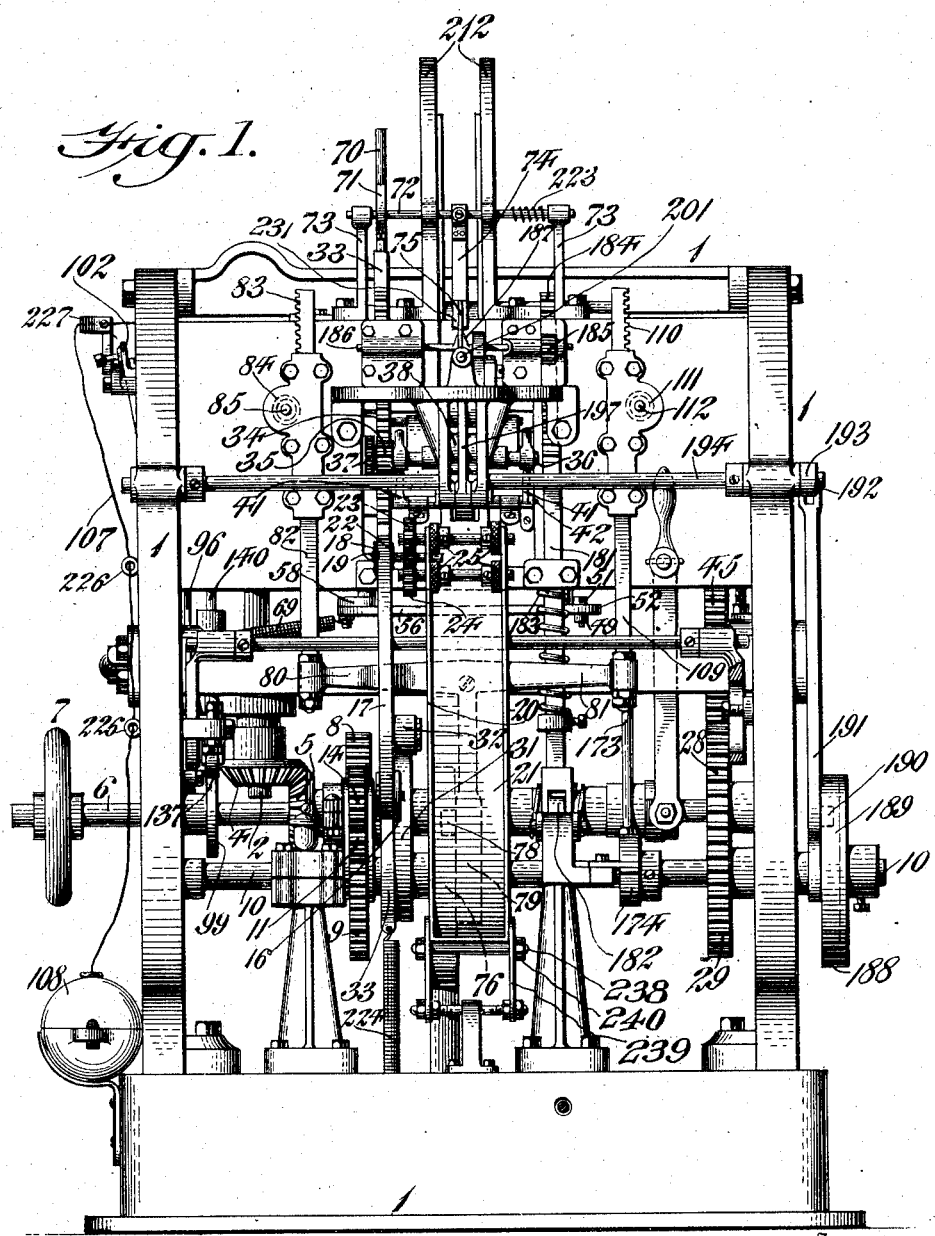

H. L. ROTH.
TAG STRINGER MACHINE.
APPLICATION FILED MAY 8, 1909.

971,928.

Patented Oct. 4, 1910.

13 SHEETS—SHEET 1.

Witnesses
H. G. Dieterich
P. F. Nagle

Inventor
Harry L. Roth.
By Wiedersheim & Fairbanks
Attorneys

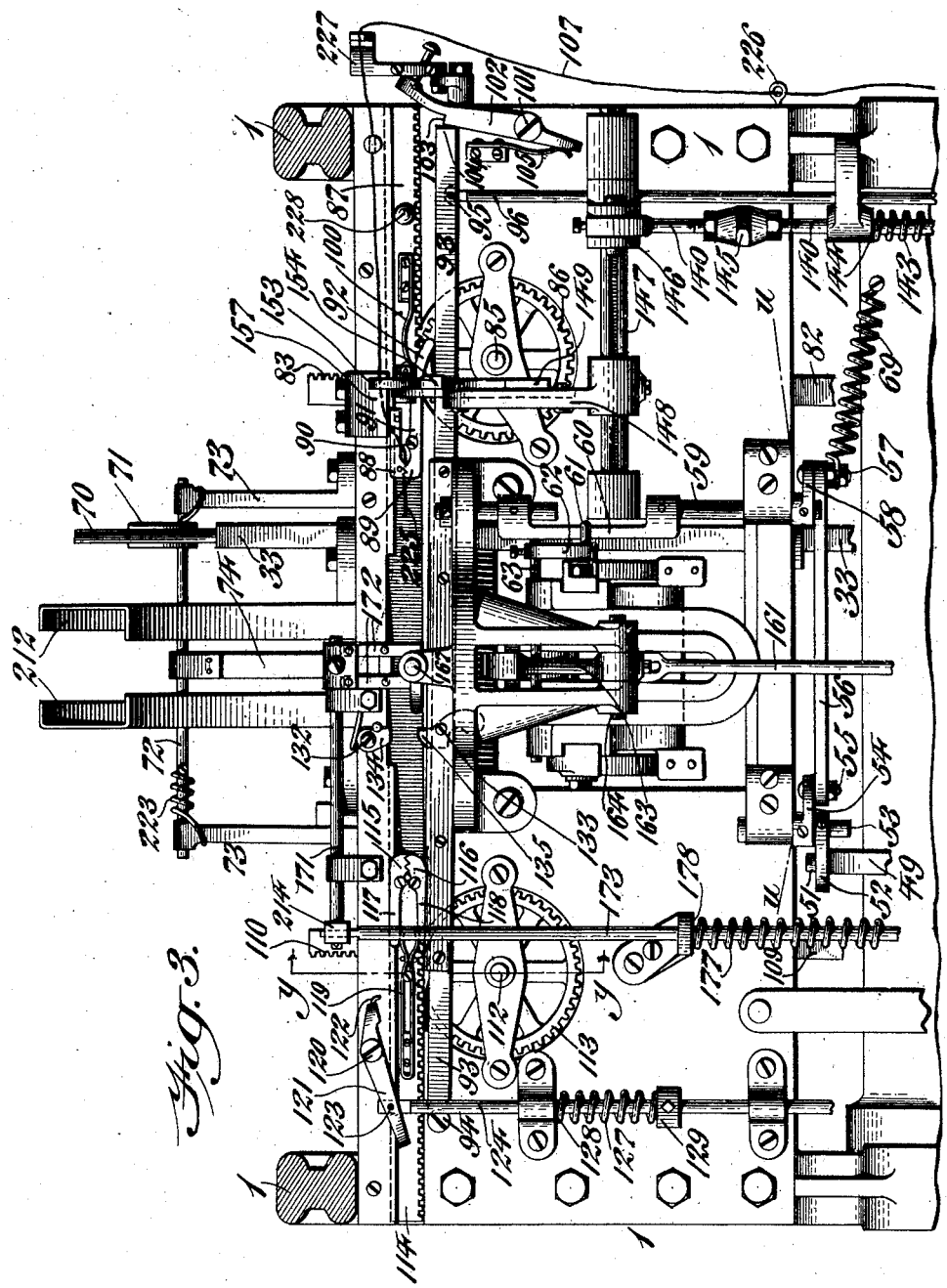

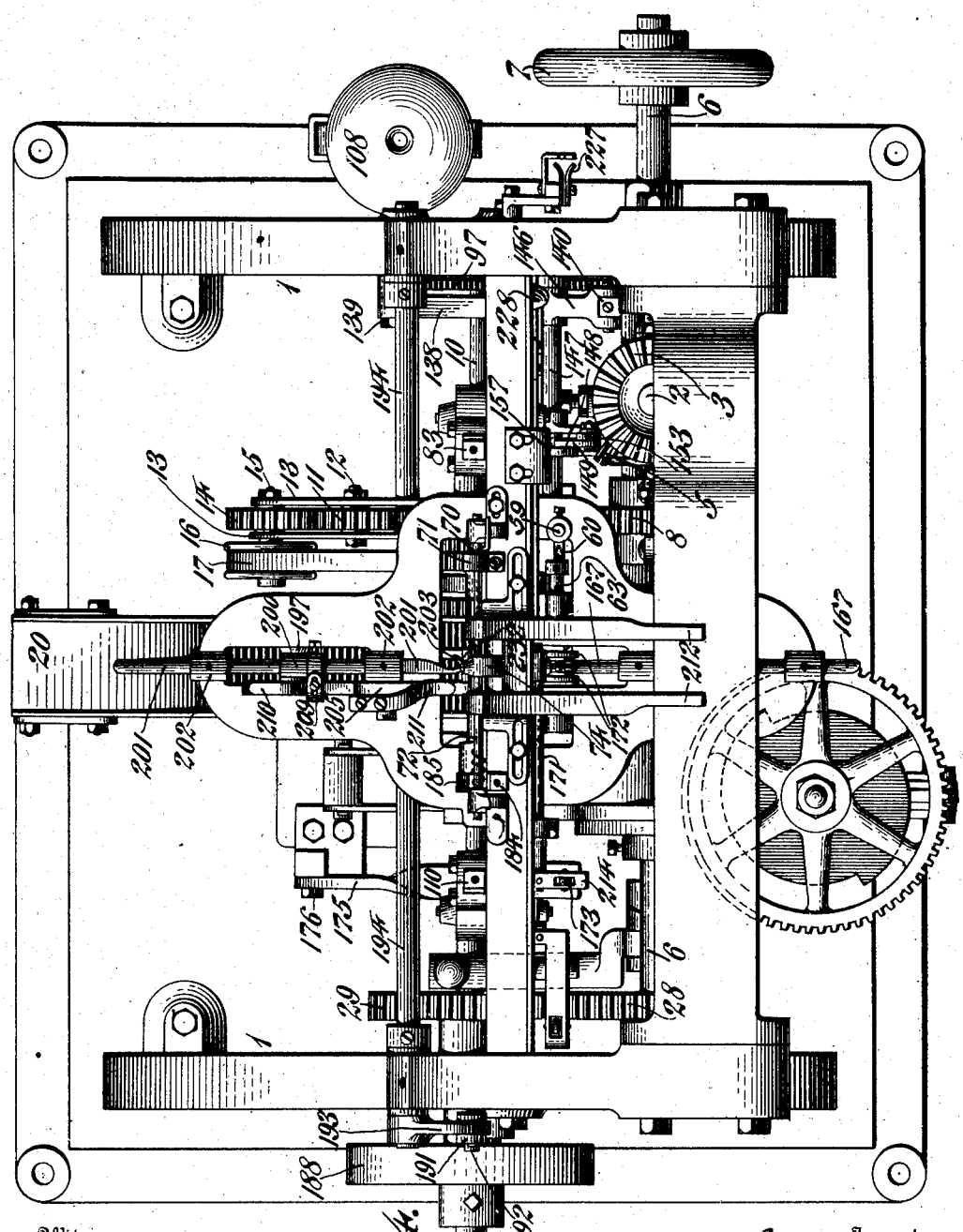

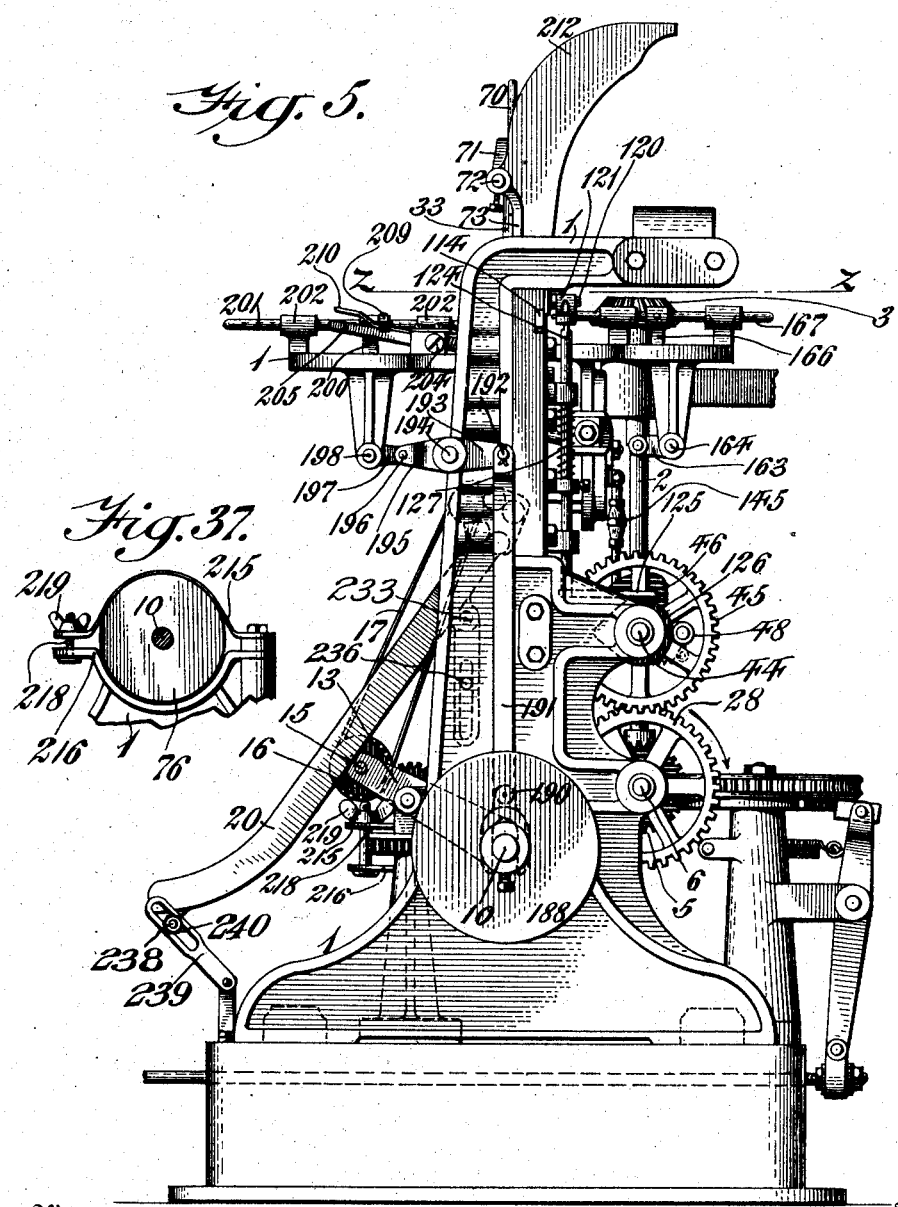

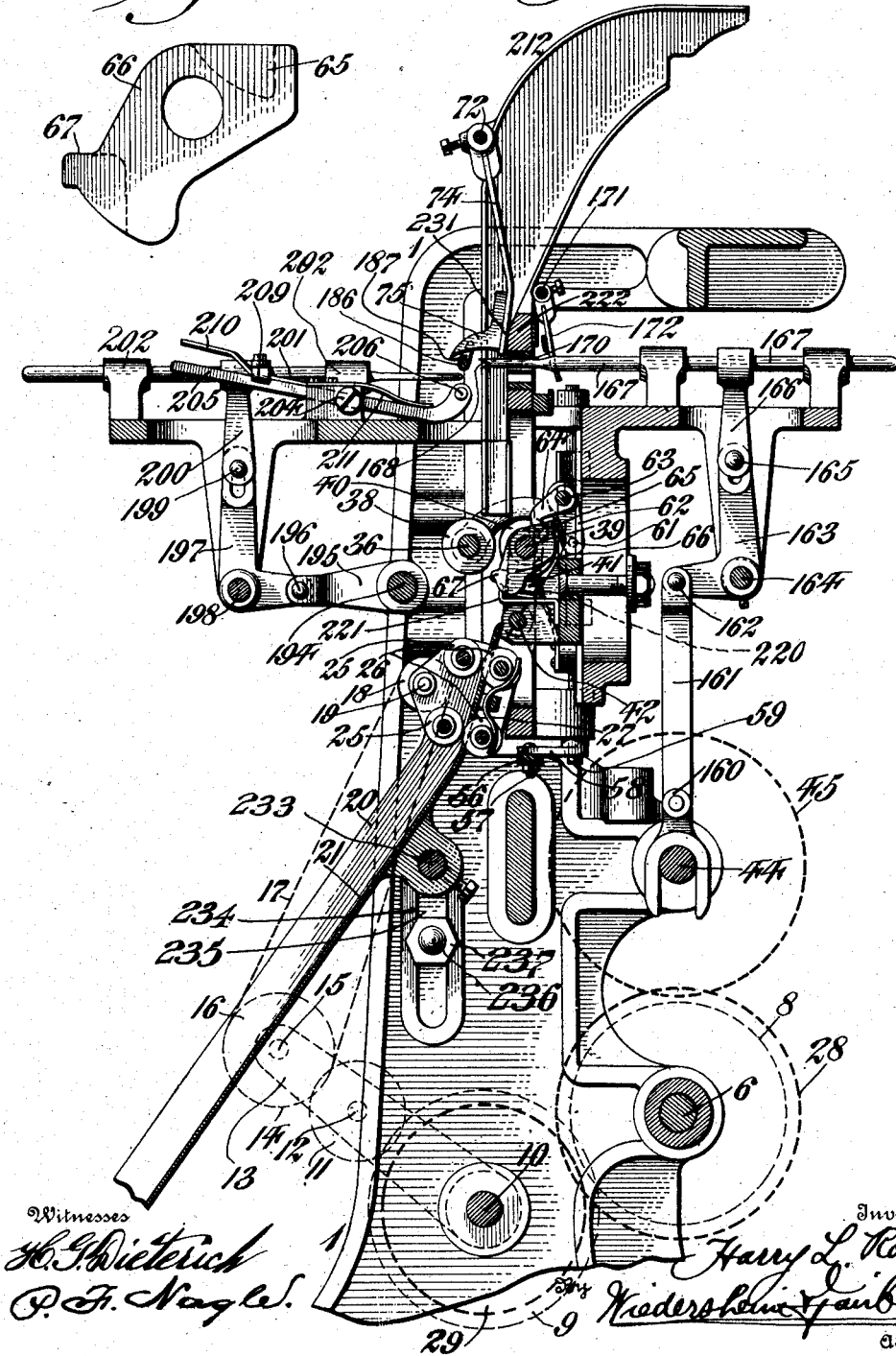

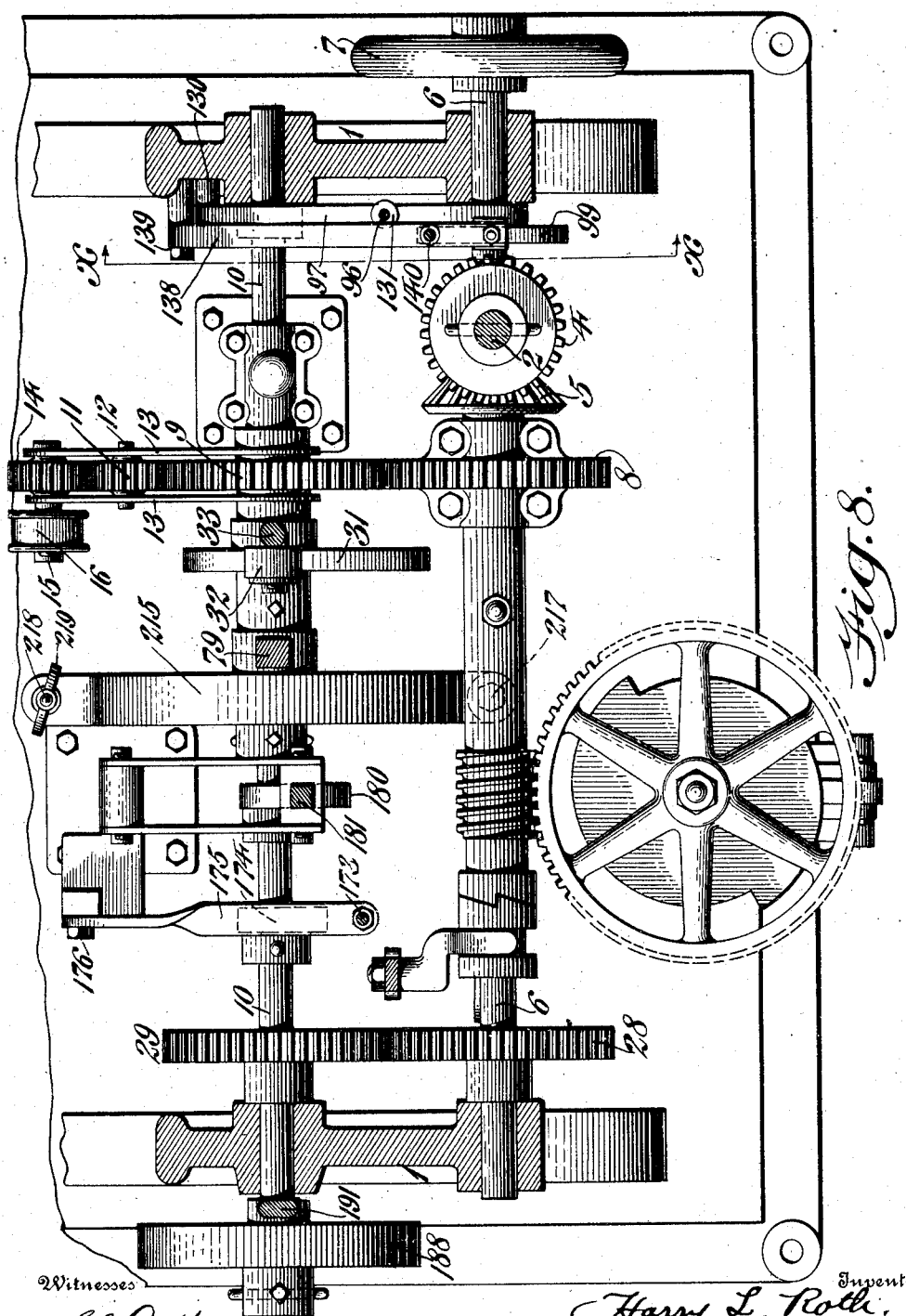

H. L. ROTH.
TAG STRINGER MACHINE.
APPLICATION FILED MAY 8, 1909.

971,928.

Patented Oct. 4, 1910.
13 SHEETS—SHEET 8.

Witnesses
H. G. Dieterich
P. F. Nagle

Inventor
Harry L. Roth
By Wiedersheim & Fairbanks
Attorneys

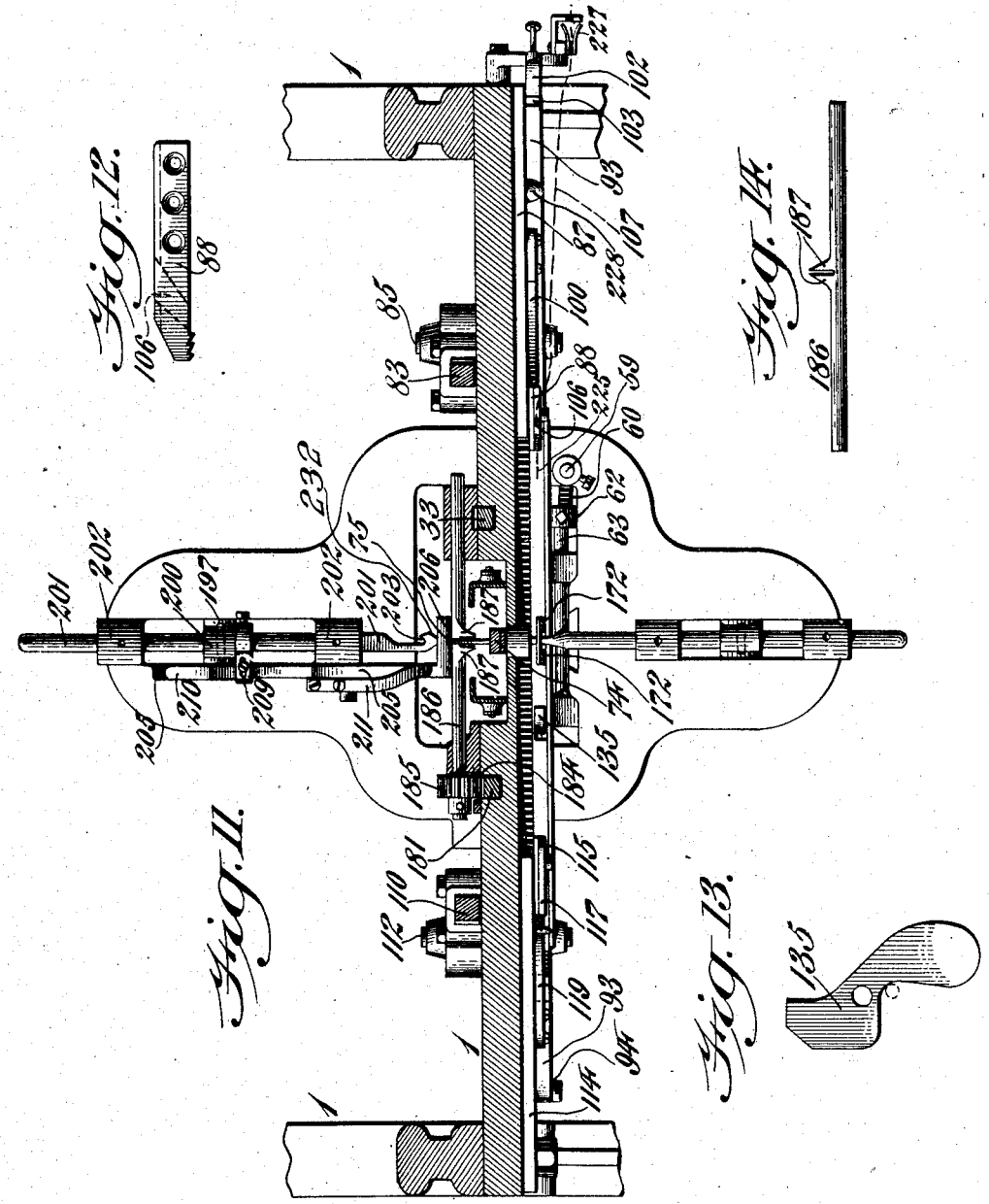

H. L. ROTH.
TAG STRINGER MACHINE.
APPLICATION FILED MAY 8, 1909.
971,928.
Patented Oct. 4, 1910.
13 SHEETS—SHEET 10.
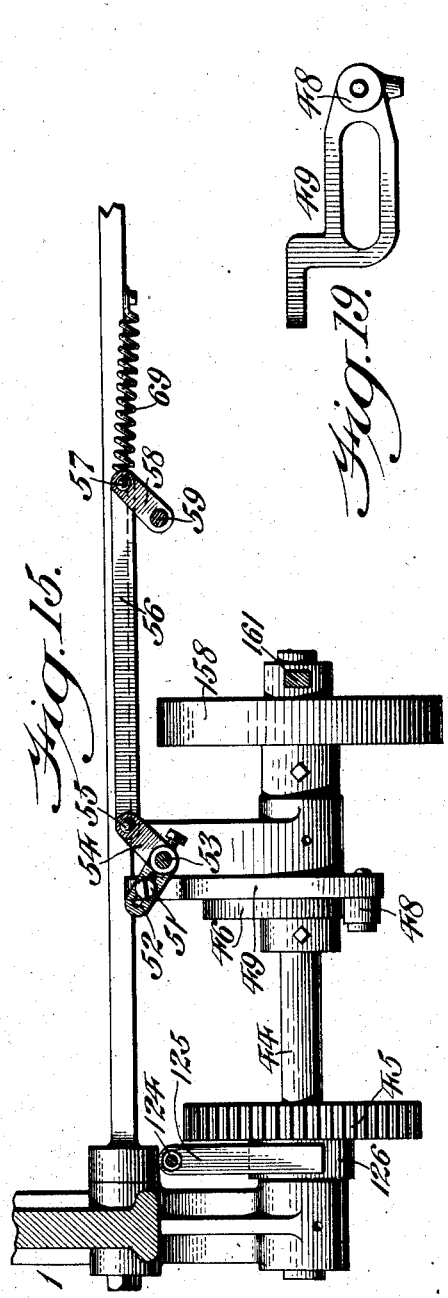
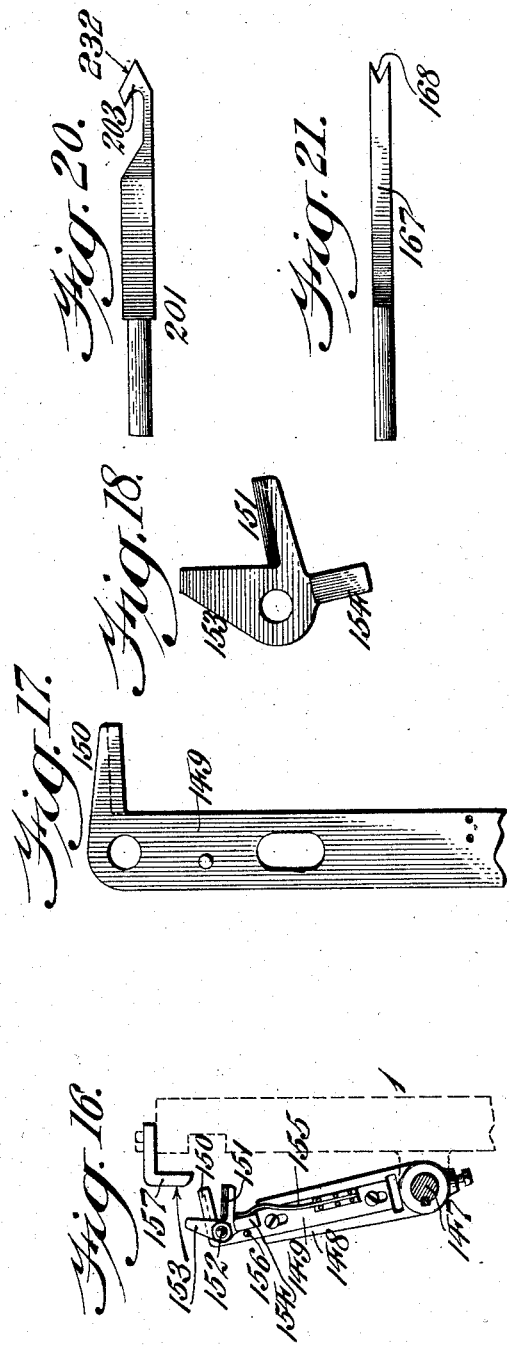

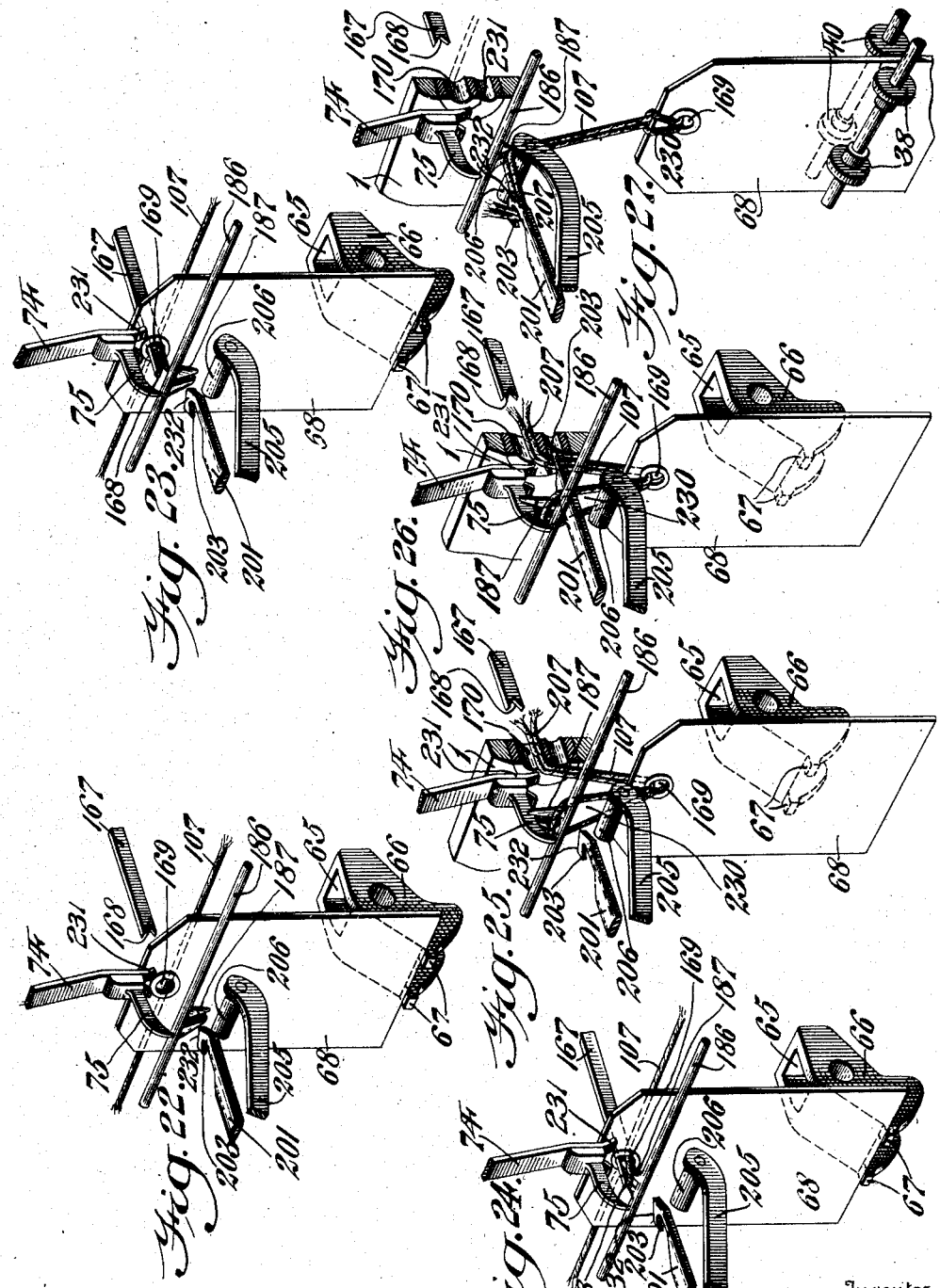

H. L. ROTH.
TAG STRINGER MACHINE.
APPLICATION FILED MAY 8, 1909.

971,928.

Patented Oct. 4, 1910.
13 SHEETS—SHEET 12.

Witnesses
H. S. Dieterich
P. F. Nagle

Inventor
Harry L. Roth.
By Friedersheim & Fairbanks
Attorneys

THE NORRIS PETERS CO., WASHINGTON, D. C.

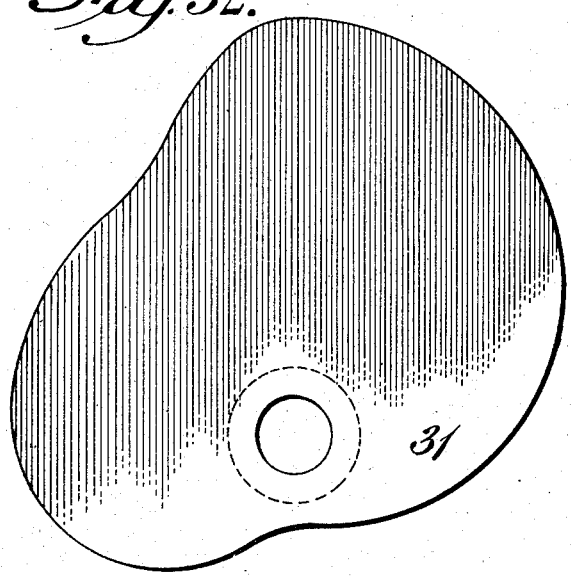
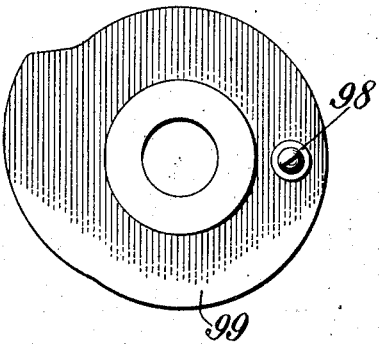
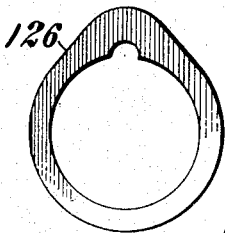
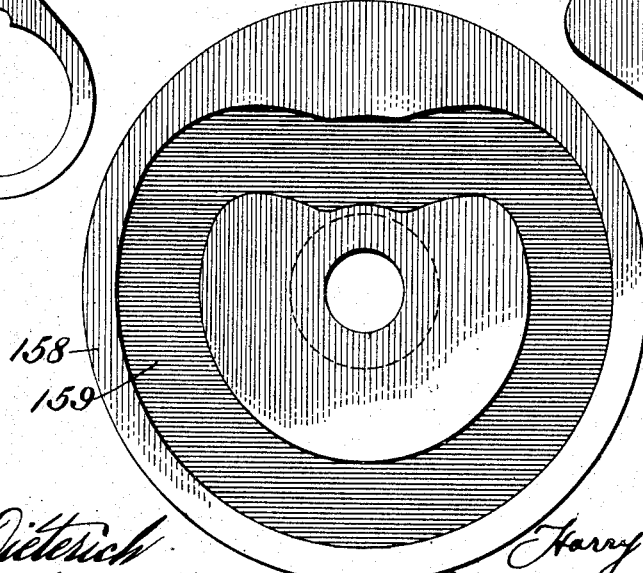
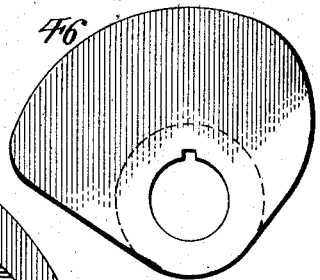

UNITED STATES PATENT OFFICE.

HARRY L. ROTH, OF PHILADELPHIA, PENNSYLVANIA, ASSIGNOR TO INDUSTRIAL EQUIPMENT COMPANY, OF PHILADELPHIA, PENNSYLVANIA, A CORPORATION OF DELAWARE.

TAG-STRINGER MACHINE.

971,928.  Specification of Letters Patent.  Patented Oct. 4, 1910.

Application filed May 8, 1909. Serial No. 494,883.

*To all whom it may concern:*

Be it known that I, HARRY L. ROTH, a citizen of the United States, residing in the city and county of Philadelphia, State of Pennsylvania, have invented a new and useful Tag-Stringer Machine, of which the following is a specification.

My present invention consists of a novel and simplified construction of a tag stringing machine by the employment of which a large number of tags per minute of any desired size may be strung.

In a co-pending application, filed May 8, 1909, Serial No. 494,882, I have described and broadly claimed a novel construction of a tag machine wherein the tags are cut, printed, apertured and the aperture reinforced, and it is in conjunction with such a machine that my present tag stringing machine is employed in practice, although it is to be understood that my tag stringing machine may be employed to advantage in conjunction with any desired or conventional type of tag making machine or tag feeding mechanism.

My invention further consists of a novel construction of a tag machine wherein the needle which passes the string through the eyelet of the tag has a lineal movement and wherein the hook which is employed to form a loop has only a longitudinal movement, the necessity of giving this hook a lateral movement on its rearward stroke having been overcome, whereby the stringing mechanism may be operated at a much greater speed.

It further consists of a novel construction of a stringing mechanism wherein a preferably forked presser foot is employed to maintain the portion of the tag surrounding the eyelet in proper position during the stringing of the tags, such presser member having secured thereto an arm or hook coacting with the fingers forming the loop, in order that the loop will be formed in a very reliable and efficient manner.

It further consists of a novel construction and arrangement of actuating mechanism whereby the various operations of the stringing mechanism are properly timed and carried out in their logical order.

It further consists of a novel construction of string feeding mechanism, string cutting mechanism, tag feeding mechanism, tag arresting mechanism, and tag stringing mechanism, whereby the various operations are carried out at a much higher speed than has heretofore been deemed possible in devices of this character.

It further consists of other novel features of construction, all as will be hereinafter fully set forth.

For the purpose of illustrating my invention, I have shown in the accompanying drawings a preferred embodiment thereof since this embodiment has been found in practice to give satisfactory and reliable results, although it is to be understood that the various instrumentalities of which my invention consists can be variously arranged and organized and that my invention is not limited to the precise arrangement and organization of these instrumentalities as herein set forth.

Figure 2:
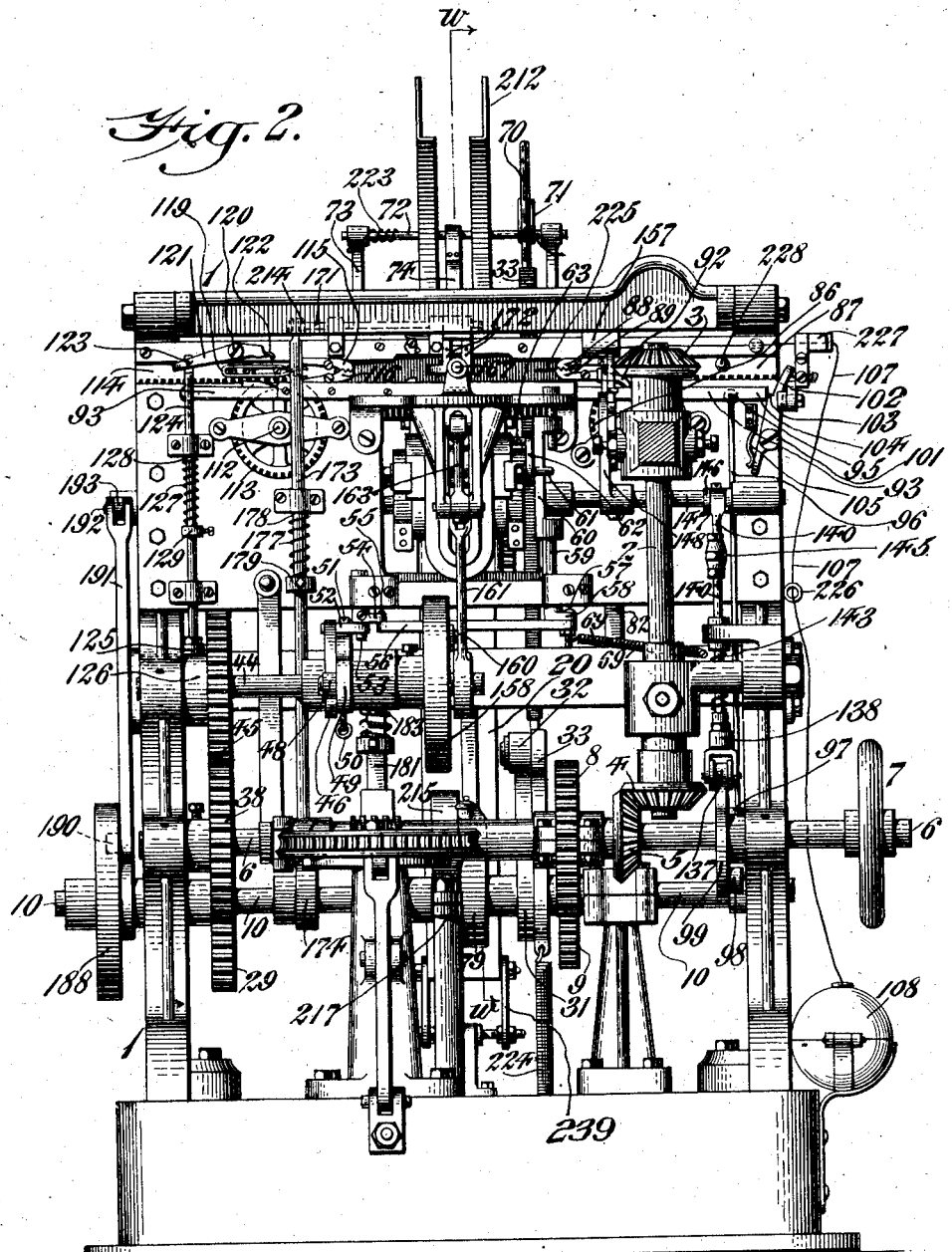
Figure 9:
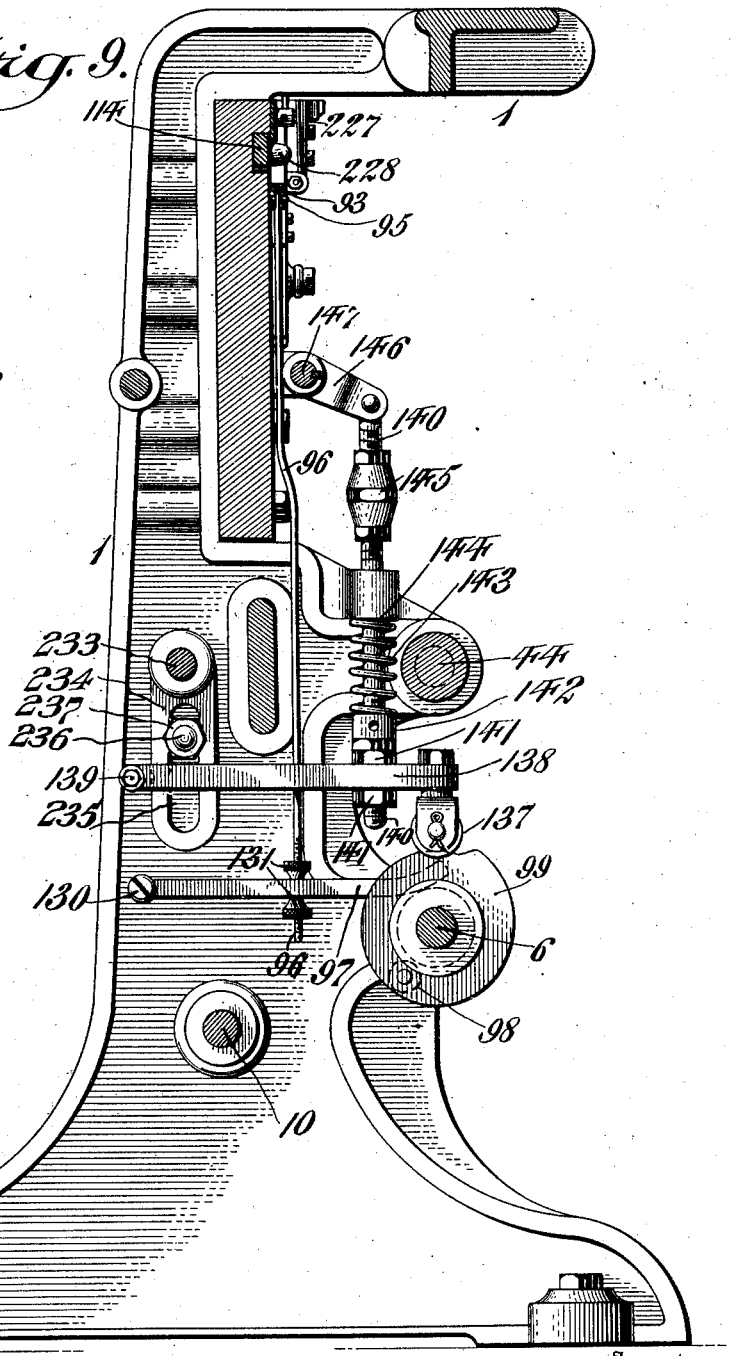
Figure 10:
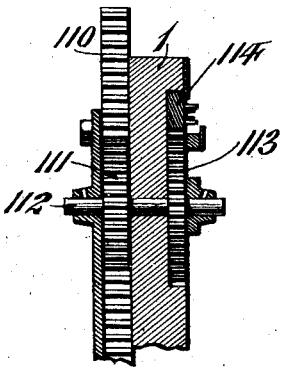
Figure 28:
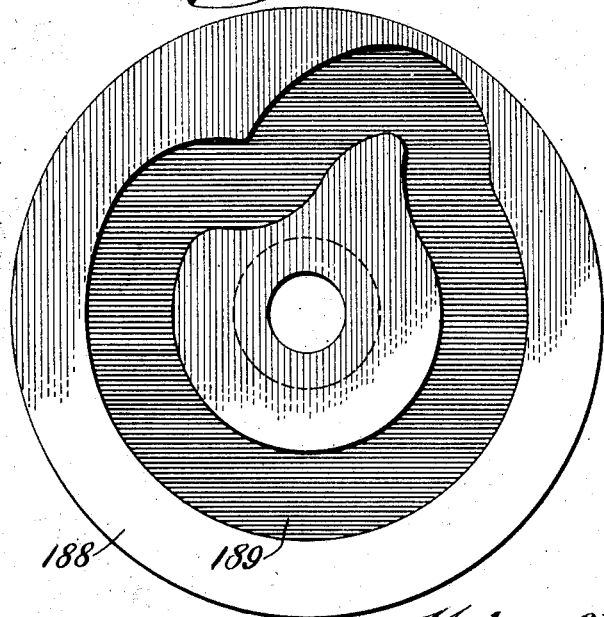
Figure 29:
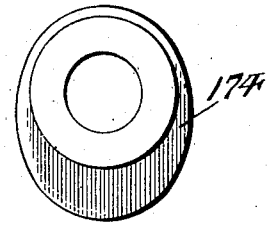
Figure 30:
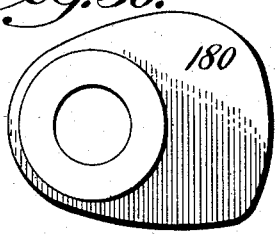

Figures 1 and 2 are front and rear elevations, respectively, of a tag stringing machine embodying my invention. Fig. 3 is an elevation of certain of the parts seen in Fig. 2, on an enlarged scale. Fig. 4 is a plan view of certain portions of the machine. Fig. 5 is a side elevation of the machine. Fig. 6 is a vertical section on line $w$—$w$ in Fig. 2. Fig. 7 is a side elevation of a detached portion of the machine. Fig. 8 is a plan view of certain detached portions of the machine. Fig. 9 is a vertical section on line $x$—$x$ in Fig. 8. Fig. 10 is a vertical section on line $y$—$y$ in Fig. 3. Fig. 11 is a horizontal section on line $z$—$z$ in Fig. 5. Figs. 12, 13 and 14 are detail views of certain detached parts of the machine. Fig. 15 is a horizontal section on line $u$—$u$ in Fig. 3. Fig. 16 is a side elevation of shears employed. Figs. 17 to 21, both inclusive, are detail views of certain detached portions of the machine. Figs. 22 to 27, both inclusive, are perspective views of a tag and certain detached portions of the machine, and illustrate the consecutive stages during the process of forming a loop in the string and securing the latter to a tag. Figs. 28 to 36, both inclusive, are side elevations of cams employed. Fig. 37 is a side elevation of certain detached portions of the machine.

Similar numerals of reference indicate corresponding parts in the figures.

Referring to the drawings:—1 designates the frame of the machine in which is journaled the main driving shaft 2 whose upper end has fast thereon the bevel gear wheel 3 which latter in the present instance is adapted to be driven by a bevel gear wheel in a tag machine employed in conjunction with the stringing machine herein referred to, although it is apparent that the same may be actuated by any desired mechanism. The lower portion of the shaft 2 has fast thereon a bevel gear wheel 4 that meshes with a bevel gear wheel 5 fast on the shaft 6 journaled in the frame of the machine. It is evident that if desired, the shaft 2 may be dispensed with and in lieu thereof the shaft 6 may serve as the main driving shaft by connecting therewith any suitable driving mechanism.

The shaft 6 is provided in the present instance with a hand wheel 7 whereby the several parts of the machine may be operated by hand when desired. The shaft 6 has fast thereon a gear wheel 8 that meshes with an idler 9 loose on the shaft 10, journaled in the frame 1 of the machine. The idler 9 meshes with an idler 11 which latter is journaled at 12 in the arms 13, see Figs. 1, 2 and 6, and meshes with a gear wheel 14 fast on the shaft 15 that is journaled in the free ends of the arms 13 and has fast thereon a band pulley 16 partly around which passes the belt 17 so as to impart motion to the pulley 18 for a purpose hereinafter described.

*Tag feeding mechanism.*—The pulley 18 is fast on a shaft 19 journaled in the upper portions of the walls 20 of a chute 21 as will be understood from Figs. 1 and 6. The shaft 19 has fast thereon the gear wheel 22 that meshes with the gear wheels 23 and 24 so as to impart motion to the feed rollers 25 and 26 for a purpose hereinafter described. It will be observed, on referring to Fig. 6, that the rollers 26 are retained in contact with the rollers 25 by the tension of the spring 27.

The shaft 6 has fast thereon a gear wheel 28 that meshes with a gear wheel 29 fast on the shaft 10, it being observed that said shaft 10 has fast thereon a cam 31, see Figs. 1, 2, 8 and 32, whose working face or periphery is in contact with a roller 32 carried by a rack bar 33 so as to impart a vertical reciprocating motion to said bar, it being understood that the latter is guided in the frame 1. The teeth 34 in the upper portion of the rack 33 are in mesh with a gear wheel 35 that is fast on a shaft 36 journaled in the frame of the machine, see Fig. 1. The shaft 36 has fast thereon a gear wheel 37 and a feed or drawing roller 38, it being understood that the gear wheel 37 is in mesh with a similar wheel (not illustrated) fast on a shaft 39 whereupon motion is transmitted from the shaft 36 to the shaft 39 and consequently to a feed or drawing roller 40 fast on said shaft 39, see Fig. 6. The shaft 39 is journaled in the arms 41 that are pivoted at 42 in the frame of the machine, whereby the feed roller 40 may be brought against the feed roller 38 and also removed from its contact therewith, as hereinafter described. Bearing against the arms 41 are springs 220, one of which is seen in Fig. 6 and the purpose of which is to retain the arms 41 normally in the position seen in said Fig. 6.

Journaled in the frame of the machine is a shaft 44, see more particularly Figs. 2, 6 and 15, provided with a gear wheel 45 which may be keyed or otherwise secured thereon and which is in mesh with the gear wheel 28, fast on the shaft 6, whereby motion is transmitted from the latter to the shaft 44 and consequently to a cam 46 fast thereon. The gear wheel 28 is also in mesh with the gear wheel 29, fast on the shaft 10, whereupon motion from the shaft 6 is transmitted to the shaft 10 for a purpose hereinafter described.

The periphery or working face of the cam 46 is in contact with a roller 48 carried by a link 49, see also Fig. 19, so as to impart a reciprocating motion to said link 49, it being understood that said roller 48 is retained in contact with the cam by the tension of a spring 50, one end of which is secured to the link 49 while its opposite end is secured to some convenient fixed point.

The link 49 has pivoted thereto at 51, a slotted arm 52, which latter is fast on a rod 53 that is journaled in the frame of the machine as will be understood from Fig. 2. The rod 53 has fast thereon an arm 54 whose free end is pivoted at 55 to a link 56 whose opposite end has pivoted thereto at 57 the free end of an arm 58 that is fast on a rod 59, journaled in the frame of the machine and provided with a member 60 that coöperates with a stud 61 that projects from an arm 62 fast on the shaft 63.

The shaft 63 has fast thereon a lever 64, best seen in Fig. 6, whose free end is bent downwardly so as to engage the cavity 65, see also Fig. 7, in the finger 66 fast on the shaft 39 and for a purpose hereinafter described. The finger 66 is provided with the projecting members 67 adapted to support a tag 68, to be strung, as best seen in Figs. 22, 23 and 24. The lower extremity of the finger 66 bears against a stop 221 for a purpose hereinafter described.

The link 56, seen in Fig. 15, has secured thereto one end of a spring 69 whose opposite end is secured to a convenient fixed point of the machine and is adapted to retain said link 56 and its adjuncts, normally, in their inoperative or home positions.

Referring now to Figs. 1 to 6, both inclusive, it will be seen that the upper portion of the rack bar 33, is provided, in the present instance, with a cylindrical portion 70 that is in contact with a lever 71 fast on a shaft 72, journaled in standards 73 supported by the frame 1. The shaft 72 has fast thereon a finger or arm 74 whose lower portion forms a forked presser foot 231 and is provided with an arm or hook 75, as best seen in Fig. 6, and for a purpose hereinafter described.

*The string feeding mechanism.*—Referring now to Figs. 1, 2, 3, and 31, it will be seen that the shaft 10 has fast thereon the cam 76 provided with the groove 77 in which is placed the roller 78 that is carried by the bar 79 which is provided with the projecting members or arms 80 and 81 to which up and down movements are imparted by the rotation of the cam 76.

The projecting member or arm 80 has secured thereto a rack bar 82, see Fig. 1, whose rack teeth 83 engage the teeth in a gear wheel 84 that is fast on a shaft 85 journaled in the frame 1 so as to impart motion to said shaft and consequently to a gear wheel 86 fast thereon. The gear wheel 86 meshes with the rack bar 87, see Fig. 3, that is guided in ways or grooves in the frame 1 so as to move to and fro therein and for a purpose hereinafter described.

The rack bar 87 as best seen in Fig. 3, has rigidly secured thereto a clamping jaw 88 that coöperates with a clamping jaw 89 pivoted at 90 in the rack bar 87 and provided with an arm or extension 91 whose extremity 92 rests upon a bar 93 pivoted at 94 in the frame 1. The bar 93 has pivoted thereto at 95 one end of a rod 96 whose lower extremity is passed through a lever 97 fulcrumed at 130 in the frame 1, as best seen in Fig. 9, it being observed that the lever 97 lies in the path of a roller 98, carried by a cam 99 and coöperating with said lever 97 for a purpose hereinafter described. The rod 96 has fitted thereon the thumb nuts 131 whereby said rod and the lever 97 may be regulated by the proper adjustment of the thumb nuts 131. The extremity 92 of the arm 91 is retained in contact with the bar 93 by the tension of a spring 100.

Pivoted at 101, in the frame 1, as best seen in Fig. 3, is a latch 102 that is provided with a shoulder 103 adapted to support the extremity 104 of the pivoted bar 93 when the latter is in its elevated position and for a purpose hereinafter described. When the extremity 104 of the bar 93 is elevated beyond the shoulder 103, in the latch 102, the latter is turned on its pivot 101, due to the tension of a spring 105, and causes said shoulder 103 to pass under the extremity 104 in the bar 93, and thus retain the latter in its elevated position during a predetermined length of time.

The clamping jaw 88, best seen in Fig. 12, is provided with an eye or opening 106 through which the end of the string 107 is passed prior to its being placed between the operative portions of the clamping jaws 88 and 89 as will be understood from Fig. 3. It will be understood from Fig. 2, that the string 107 is drawn from a ball, or its equivalent, placed within a suitable receptacle 108 suitably carried by the frame 1. The rack bar 87, as seen in Fig. 2, is provided with a lug 228 adapted to be brought in contact with the latch 102, at certain times, so as to turn the latter on its pivot 101 and remove the shoulder 103 from its engagement with the extremity of the bar 93 for a purpose hereinafter described.

The arm 81 has secured thereto a rack bar 109 whose teeth 110 are in mesh with a gear wheel 111 fast on a shaft 112 journaled in the frame 1 of the machine, as will be understood from Fig. 1. The shaft 112 has fast thereon a gear wheel 113, see Fig. 2, that meshes with the rack bar 114 that is guided in ways in the frame 1 so as to move to and fro therein for a purpose hereinafter described.

The rack bar 114 has pivoted thereto the clamping jaws 115 and 116 provided with the extensions or arms 117 and 118 respectively, it being observed that said jaws 115 and 116 are retained normally, in their closed positions by the tension of a spring 119 as will be understood from Fig. 3.

Fulcrumed at 120 in the frame 1 is a lever 121 whose extremity 122 is adapted to be brought in contact, at certain times, with the arm or extension 117 of the clamping jaw 115 so as to remove the latter from its contact with the jaw 116 for a purpose hereinafter described.

The lever 121 has suitably pivoted thereto as at 123 the upper portion of a rod 124 that is guided in the frame 1 so as to move up and down therein, it being observed that the lower extremity of said rod 124 is provided with a projecting member 125, best seen in Fig. 5 and that rests upon a cam 126, the construction of which is most clearly illustrated in Fig. 34, whereby said rod 124 is raised and lowered in order to rock the lever 121 for a purpose hereinafter described. It is to be observed that the projecting member 125 in the lower portion of the rod 124 is retained in contact with the cam 126 by the tension of a spring 127 that encircles said rod and whose upper extremity bears against a fixed point as at 128 while its lower extremity bears against a collar 129 adjustably secured to the rod 124.

The frame 1 has pivoted thereto at 132 and 133 the dogs 134 and 135 respectively that coöperate with the gripping jaws 115 and 116 in a manner hereinafter described and as best seen in Fig. 3.

*The cutting mechanism for the string.*—Referring now to Figs. 2, 3, 5, 9, 16, 17 and 18 it will be seen, from Fig. 9, that the shaft 6 has fast thereon the cam 99 that coöperates with a roller 137 carried by the forward end of a lever 138 that is fulcrumed at 139 in the frame 1. A rod 140 passes through the lever 138 and has its lower portion threaded thereby adapting the same to receive the nuts 141, whereby said rod is adjustably connected with the lever 138 for a purpose hereinafter described. The rod 140 has adjustably mounted thereon a collar 142 against which bears one end of a spring 143 whose opposite end bears against some fixed point as at 144 whereupon the tension of said spring 143 causes the roller 137 to bear at all times against the cam 99. The rod 140 is provided with a turn buckle 145 which when rotated in one direction or the other lengthens or shortens the rod 140 so as to adjust the throw of the lever 146 to which the upper extremity of the rod 140 is pivoted. The lever 146 is fast on a shaft 147, that is journaled in the frame of the machine, see also Fig. 16, so that motion may be transmitted from the cam 99 to said shaft 147 and consequently to an arm or lever 148 keyed or otherwise rigidly secured thereto.

The lever 148 has adjustably fitted therein a bar 149 whose upper portion is provided with a cutting blade 150 that coöperates with a cutting blade 151, said blades 150 and 151 constituting shears for severing the string 107. The blade 151 is pivoted at 152 to the bar 149 and is provided with the arms or extensions 153 and 154, the object of which is hereinafter described. The shears are retained normally, in their open position by the tension of a spring 155, the free end of which bears against the arm or extension 154, it being understood that the degree of opening of said shears is limited by the stop 156 on the bar 149 and against which abuts the arm or extension 154. The frame 1 has fixedly secured thereto a member 157 that coöperates with the arm or extension 153 as hereinafter described.

*Mechanism for passing the string 107 through an aperture in a tag and securing the string to the latter.*—The shaft 44, seen in Fig. 2, has fast thereon a cam 158 provided with a groove 159 in which travels a roller 160 carried by a bar 161 guided in the frame 1 so as to move up and down therein, see also Figs. 6 and 35. The upper portion of the rod 161 has pivoted thereto at 162 one extremity of a bell crank lever 163 fulcrumed at 164 in the frame 1, it being observed that the opposite extremity of said lever 163 is coupled at 165 to a member 166 that is secured to a needle 167 so as to impart a reciprocating motion to the latter when the bell crank 163 is rocked. One end of the needle 167 is notched as at 168, see Fig. 6 and Figs. 22 to 27 inclusive, whereby said notch engages that portion of the string 107 that lies in its path and carries the same through an aperture 169 in a tag 68 for a purpose hereinafter described.

The frame 1 is provided with a guide opening 170 seen in Figs. 6, 25, 26 and 27, through which the forward portion of the needle 167 passes when pushing the string 107 through an aperture 169. Journaled in the frame 1 is a shaft 171, see also Fig. 3, that has secured thereon the fingers 172 that are adapted to be brought toward the string 107, at certain times, and thus positively retain that portion of the string 107 that is to be engaged by the needle 167, in the proper position relatively to the notch 168 in said needle, so that when the latter is advanced it will take hold of the string 107 and carry the same with it.

The shaft 171 has fast thereon an arm or lever 214 to which is pivoted the upper extremity of a rod 173 guided in the frame 1 and adapted to be moved up and down by reason of the cam 174 fast on the shaft 10. It will be seen on referring to Fig. 8 that the lower extremity of the rod 173 is secured to a lever 175 that is fulcrumed at 176 on the frame 1 and rests upon the cam 174. The lever 175 is retained in contact with the cam 174 by the tension of a spring 177 that encircles the rod 173 and has one of its extremities bearing against a fixed point, as at 178 while its opposite extremity bears against a collar 179 adjustably secured to said rod 173.

It will be seen from Fig. 8, that the shaft 10 has fast thereon a cam 180 that coöperates with a rack bar 181 seen also in Figs. 1 and 11 and guided in the frame 1, it being observed that the lower extremity of the bar 181 has pivoted therein a roller 182 that rests upon the cam 180 and is retained in contact therewith by the tension of a spring 183. The upper portion of the bar 181 is provided with teeth 184 that mesh with the teeth of a pinion 185 fast on a shaft 186 that is journaled in the frame 1, and provided with fingers 187 that coöperate with the hook 75, for a purpose hereinafter described.

The shaft 10 has fast thereon a cam 188, see Figs. 1, 2, 4, 5, 8 and 28, that is provided with a groove 189 in which is placed a roller 190 carried by a rod 191 that has pivoted in its upper extremity as at 192 one end of a lever 193 that is fast on a shaft 194 journaled in the frame 1, it being seen from Figs. 5 and 6 that said shaft 194 has fast thereon a lever 195 that has pivoted thereto at 196 one extremity of a bell crank lever 197 fulcrumed at 198 in the frame 1. The opposite extremity of the lever 197 is coupled at 199 to a lever 200 that is fast on a needle 201, the latter being adapted to move to and fro in the guides 202 supported on the frame 1. The inner extremity of the needle 201 is provided with a hook 203, see Fig. 11, that is adapted to take hold of the string 107, as will be understood from Figs. 26 and 27, and the end of the hook is provided with a cam face 232.

The frame 1 has pivoted thereto at 204, see Fig. 6, a lever 205 whose inner extremity is provided with a stud 206 that is adapted to be brought against the shaft 186 so as to retain the loose ends 207 of the string 107 firmly against said shaft 186 while a tag 68 is drawn downward, as hereinafter described, it being understood that the downward movement of a tag 68 tightens the loop 230, seen in Fig. 27 against the tag when the ends 207 of the string 107 are held against the shaft 186.

The needle 201 has secured thereto a projecting member 209 that moves to and fro, in unison therewith and bears against a spring 210 secured to the lever 205, whereupon the reciprocating motions of the needle 201 will rock said lever 205 and thus cause the stud 206 to be brought against the ends 207 of the string 107 during the tightening of a loop 230 against a tag 68, and also removed from said ends 207 when the stringing of a tag 68 is completed. The lever 205 is retained normally in its home position by the spring 211.

The frame 1 has secured in its upper portion the guide or chute 212 that directs the tags 68, fed thereto, automatically or by hand, to the drawing or feed rolls 38 and 40.

Figure 31:
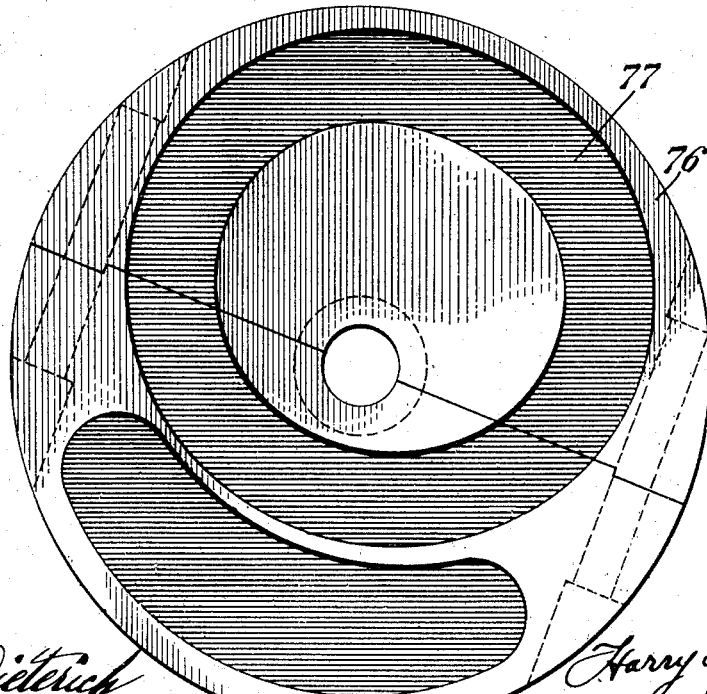

The cam 76, seen in Fig. 31 has passed partly around it the brake bands 215 and 216 one end of each of which is secured to some convenient fixed point as at 217, see Figs. 2 and 36, it being observed that the free ends of said bands are not in contact with each other and that a bolt 218 is passed through said free ends and is provided with a thumb nut 219 which when tightened draws said ends together and thereby produces the desired degree of friction between said bands and the cam 76, for a purpose hereinafter described.

The operation of my novel construction of tag stringing machine can now be readily understood and is as follows:

*Feeding of the tags into position to be strung.*—Assuming the machine to be in motion, the tags 68, to be strung, are fed, one by one, either automatically or by hand and at proper intervals to the chute 212, seen in Fig. 6, and slide down said chute until the bottom edge of a tag 68 comes in contact with the finger 74 and remains there until the lower portion of said finger 74 is swung away from the bar 222 by reason of the rotation imparted to the shaft 72. The shaft 72 is rotated by the downward movement of the bar 33 whose upper portion 70 is brought below the upper extremity of the lever 71 thus permitting the latter and consequently the shaft 72 and finger 74 to rotate, due to the tension of the spring 223 as best seen in Fig. 3, it being remembered that the lever 71 and finger 74 are fast on the shaft 72. The rotation of the shaft 72, as above described, causes the lower portion of the finger 74 to move away from the bar 222 and thus permits a tag 68 to slide downward through the space between the finger 74 and bar 222 until its downward movement is stopped by the projecting members 67 on the finger 66, as will be understood from Figs. 22, 23 and 24. It is to be understood that when the lower portion of the finger 74 is removed from the bar 222, the needle 167 is in its extreme rearward position, as seen in Fig. 5, whereupon its forward extremity is out of the path of a tag 68. When a tag 68 has reached the position seen in Figs. 22, 23 and 24, the bar 33 is elevated by the rotation of the cam 31 against the tension of the spring 224, as seen in the lower portions of Figs. 1 and 2, whereupon the upper portion 70 of the bar 33 rocks the lever 71 and consequently the shaft 72 and finger 74, and thus causes the lower portion of said finger to clamp the upper portion of a tag 68 against the bar 222.

*The operation of the stringing mechanism.*—It is to be understood that before starting the machine, the loose end 225 of the string 107, seen in Fig. 2, is passed through the guides 226, see also Fig. 1, then through the clamping device 227 and then to and through the eye 106 in the clamping jaw 88, seen in Figs. 11 and 12 and finally between the biting portions of the jaws 88 and 89 as will be understood from Fig. 2, in which it will be seen that the loose end 225 of the string 107 projects beyond the jaws 88 and 89 so as to be caught by the clamping jaws 115 and 116 as hereinafter described. When a tag 68 is in the position seen in Fig. 22 the parts 79, 80, 81, 82, 83, 109 and 110, seen in Fig. 1, are lowered by the rotation of the cam 76. The downward movement of the rack teeth 83 imparts motion to the gear wheel 84 and shaft 85 whereupon the gear wheel 86, fast on said shaft, is likewise rotated, see Figs. 2 and 3, and imparts motion to the rack bar 87 causing the latter and consequently the clamping jaws 88 and 89 carried thereby, to move from right to left, or from their home positions toward the needle 167, whereupon the loose end 225 of the string 107 is carried to the center of the machine. The downward movement of the rack teeth 110 imparts motion to the gear wheel 111 and shaft 112 whereupon the gear wheel 113 fast on said shaft is likewise rotated and imparts motion to the rack bar 114 causing the latter, and consequently the clamping jaws 115 and 116 carried thereby, to move from left to right, or from their home positions toward the needle 167, it being understood that the forward movements of the bars 87 and 114 occur simultaneously so that when said bars 87 and 114 have reached the limit of their forward movements the jaws carried by the two latter will be substantially in contact with each other. When the arms or extensions 117 and 118 of the clamping jaws 115 and 116 are passing between the dogs 134 and 135, said arms are brought toward each other and thus open the clamping jaws 115 and 116 whereupon the loose end 225, of the string 107 is passed between said jaws so as to be caught thereby when the arms or extensions 117 and 118 have reached a point beyond the dogs 134 and 135 in their travel toward the needle 167, it being understood that when said extensions 117 and 118 leave the dogs 134 and 135 the clamping jaws 115 and 116 are closed against the loose end 225 of the string 107 by the tension of the spring 119. Simultaneously with the closing of the clamping jaws 115 and 116, the rod 96 is elevated by the rotation of the cam 99 whereupon the bar 93 is turned on its pivot 94 and is elevated so as to turn the arm or extension 91 on its pivot 90 and thus open the jaw 89, thereby releasing the string 107 whereupon it is apparent that the jaws 88 and 89 exert no pull on the string 107 when said jaws are moving toward their home positions. When the underside of the extremity 104 is brought in alinement with the shoulder 103 by reason of the upward movement of the bar 93 as hereinbefore described, said shoulder is brought under the extremity 104 by the turning of the latch 102 on its pivot 10, due to the tension of the spring 105 thus causing said latch 102 to retain the bar 93 in its elevated position until the lug 228 strikes the latch 102 and throws its shoulder 103 out of engagement with the extremity 104, which occurs when the rack bar 87 reaches its home position. It is apparent that when the bar 93 is lowered, the jaws 88 and 89 are closed and take hold of the string 107. When the jaws 115 and 116 are closed upon the loose end 225 of the string 107, as hereinbefore described, the rack bars 87 and 114 are moved away from each other, or toward their home positions by the upward movements of the rack bars 82 and 109 and consequent rotation of the gear wheels 84, 86, 111 and 113 as is apparent from Figs. 1, 2, 3 and 10. When the rack bars 87 and 114 start to move toward their home positions, as hereinbefore described, the string guide consisting of the fingers 172 is brought toward the string 107 by the downward movement of the rod 173 due to the tension of the spring 177 and rotation of the cam 174 and consequent rocking of the shaft 171 whereupon the string 107 is retained. When the rack bar 114 has reached its home position the rod 124 is elevated by the rotation of the cam 126, seen in Fig. 2, and rocks the lever 121 whereupon its extremity 122 is brought against the extension 117 of the jaw 115 and opens the latter so as to release its hold upon the string 107. When the rack bar 87 has reached its home position the jaw 89 is closed against the jaw 88, as hereinbefore described, and holds the string 107 tightly between said jaws.

*The cutting of the string.*—When the rack bar 87 has reached its home position, the rod 140, best seen in Fig. 9, is elevated by the rotation of the cam 99 and rocks the lever 146 and shaft 147 and consequently the arm 148, seen in Fig. 16, causing said arm and its adjuncts to move in the direction indicated by the arrow in said Fig. 16, so that when the member 153 is brought against the stop 157 it causes the cutting edge of the blade 151 that coöperates with the cutting edge of the blade 150 to sever the string at a point slightly beyond the forward extremities of the jaws 88 and 89 so as to leave the loose end 225 of the string 107 project beyond said jaws so as to be grasped by the jaws 115 and 116 as hereinbefore described.

*The operation of passing the string through an aperture in a tag and of forming a loop in said string, and tightening the loop against the tag.*—After the string 107 has been cut, the needle 167 is advanced by the forward movement of the member 166, seen in Fig. 6, to which motion is imparted by the bell crank lever 163, it being understood that the latter has motion imparted thereto by the rod 161 and cam 158 as will be understood from Fig. 2. The forward movement of the needle 167 carries the string 107, that lies in the path of the notch 168, through the aperture 169 in the tag 68, as will be understood from Figs. 23 and 24. The shaft 186 is then rotated by reason of the pinion 185 to which latter motion is imparted by the upward movement of the rack bar 181 due to the rotation of the cam 180 upon which rests the roller 182 seen in Fig. 1. The rotation of the shaft 186 causes the fingers 187 to move from the positions seen in Figs. 22 and 23 into that seen in Fig. 25 wherein it is seen that said fingers 187 have taken hold of the string 107 fed thereto by the needle 167. When the fingers 187 are in the position seen in Fig. 25, the needle 167 is returned to its home position by reason of the upward movement of the bar 161 to which motion is imparted by the cam 158. The needle 201 is now advanced by the forward movement of the member 200 to which motion is imparted by the bell crank lever 197 and lever 195 as will be understood from Fig. 6, it being remembered that the lever 195 is fast on the shaft 194 and that the latter has motion imparted thereto by the cam 193, bar 191 and the cam 188 as will be understood from Fig. 1. When the fingers 187 and needle 167 are in the position seen in Fig. 25, the shaft 63, seen in Fig. 6, is rocked by the rotation of the cam 46 and consequent operation of the parts 49, 52, 54, 56, 58, 59, see Figs. 2 and 15, and the parts 60, 61 and 62. The rocking of the shaft 63, seen in Fig. 6, elevates the free end of the lever 64 whereupon the lower portion of the finger 66 moves away from a tag 68 while at the same time the upper portion of the arms 41 and feed roller 40, carried thereby, are moved toward the roller 38 by the pressure of the springs 220. When the feed roller 40 is brought firmly against a tag 68 placed between it and the feed roller 38, the projecting portions 67, in the finger 66, are removed from the lower edge of a tag 68 permitting the latter to be drawn downward by the rotation of said feed rollers 38 and 40. The rotation of the cam 31 elevates the rack bar 17 and consequently rotates the pinion 34, seen in Fig. 1, whereupon rotary motion is imparted to the shaft 36 and rollers 38 and 40 so that said rollers carry a tag 68 downward, from the position seen in Fig. 24 into that seen in Figs. 25 and 26, thus forming an elongated loop 230 in the string 107, it being apparent that the fingers 187 are at this time in engagement with the string. When a tag 68 is drawn downward by the rollers 38 and 40 the presser foot 231 of the finger 74 is removed from the tag, as hereinbefore described. When a tag 68 is brought into the position seen in Figs. 25 and 26 the downward movement of such tag ceases due to a dwell in the cam 31, see Figs. 8 and 32, which when in contact with the roller 32 imparts no motion to the rack bar 17 and consequently none to the feed rollers 38 and 40, it being understood that during the time a tag 68 remains stationary, due to the dwell just referred to, the needle 201 is advanced, from its position seen in Fig. 25 into that seen in Fig. 26, in which latter figure the hook 203 has advanced and passed through the loop 230, has taken hold of the two end portions 207 of the string 107 and is in the act of drawing said end portions 207 through the loop 230. As the needle 201 moves forwardly the cam face 232 thereon engages the two ends of the string and moves the same to one side so that on the return movement of the needle 201 the hook 203 will engage the two end portions of the string and draw the same through the loop 230. I wish to call special attention to this movement of the hook, since in both its forward and rearward movement it travels in a direct longitudinal direction and has no lateral movement either on its forward or rearward stroke whereby I am enabled to operate the stringing mechanism at a very much higher speed than can be done in cases in which the needle is given a lateral movement during its longitudinal movement.

When the needle 201 has drawn the end portions 207 through the loop 230, the shaft 186 is rotated by the downward movement of the rack bar 181 and consequent rotation of the pinion 185 seen in Fig. 1 whereupon the fingers 187 are moved from the position seen in Fig. 26 into that seen in Fig. 27. The lug 206 is now brought up to the end portions 207 of the string 107 by the outward movement of the needle 201 as will be understood from Fig. 6, in which it is seen that the member 209 carried by said needle causes the lever 205 to turn upon its fulcrum 204 thus elevating the stud 206 and causing the latter to firmly clamp the end portions 207, of the string 107, against the shaft 186, it being understood that the outward movement of the needle 201 is effected by the downward movement of the bar 191 due to the rotation of the cam 188 and consequent turning of the bell crank lever 197 on its fulcrum 198 as will be understood from Fig. 5. Simultaneously with the clamping of the end portions 207, of the string 107, against the shaft 186, the tag 68 seen in Fig. 27, is again lowered by reason of the rotation of the feed rollers 38 and 40 to which motion is again imparted by the rotation of the cam 31 as hereinbefore described, it being understood that the dwell in said cam has now passed beyond the roller 32 which latter is again in contact with the working face in said cam. This downward movement of a tag 68 tightens the loop 230 against the tag as seen in Fig. 27. When a loop 230 is suitably tightened against a tag 68, the lug 206 is removed from its contact with the end portions 207, of the string 107, due to the downward movement of said lug, by the mechanism hereinbefore described. The tags 68 after leaving the feed rollers 25 and 26 enter the chute 21 and are directed by the latter to a receptacle of any suitable description, or a desired point of utilization.

The object of the brake band 215, best seen in Fig. 37, is to counteract the tendency of the shaft 10 to turn too rapidly when the heavy sides of the several cams, hereinbefore referred to, are moving downward from their uppermost positions, it being seen that in the present instance the heavy sides of the cams are all on the same side of the shaft 10.

It is to be noted that the chute 20 for the tags has adjustably secured thereto a rod 233 to which is secured an arm 234 which is slotted, as indicated at 235.

236 designates a pin carried by the casing and extending through the slot 235, said pin being provided with a suitable nut 237 whereby the arm 234 may be adjustably secured with respect to the casing to vary the angle of the discharge chute 20. The lower end of the chute 20 is deflected in any suitable manner and in the present instance is provided with a rod 238 which passes through the slotted links 239 pivotally supported to any suitable fixed point, the rod 238 being provided with suitable ends 240. It will be apparent that by this construction the angle of the discharge chute 20 may be varied as desired in accordance with the requirements and conditions met with in practice.

I am aware that it has heretofore been proposed to employ in a tag stringing machine a hook to draw the ends of the string through the loop, it being deemed essential to give to this hook a lateral movement during its longitudinal movement in order that the ends of the string would be properly engaged by such hook, but such a construction is widely differentiated from my present device since in my construction no lateral movement whatever is imparted to the hook which draws the ends of the string through the loop, the hook being moved both forwardly and rearwardly in the same longitudinal path whereby I am enabled to produce a machine which can be run at a very high speed without affecting in any manner the efficiency or accuracy of the tag stringing mechanism.

It is further to be noted that in my present construction I have produced a tag stringing mechanism wherein the movements are all positive and the employment of springs to move the different parts in one direction has been dispensed with so that there is no liability of the different parts operating at an improper time and the movement of the various parts of the machine are accurately timed under all conditions met with in practice and at all speeds.

It is further to be noted that the upper end of the tag is accurately held during the stringing operation, so that there is no liability of any improper movement thereof at such times, and the needle and also the hook will pass through the aperture of the tag without in any way damaging the same.

It will now be apparent that I have devised a novel and useful construction of tag stringing machine which embodies the features of advantage enumerated as desirable in the foregoing, and while I have in the present instance shown and described a preferred embodiment thereof which gives in practice satisfactory and reliable results it is to be understood that the same is susceptible of modifications in various particulars without departing from the spirit and scope of the invention or sacrificing any of its advantages.

Having thus described my invention, what I claim as new and desire to secure by Letters Patent, is:—

1. In a tag stringing machine, the combination of a chute to which apertured tags are adapted to be fed, means for looping strings through the apertures of the tags, a hook having a non-flexible barb and coacting with said means for effecting the tying of said strings, and means for passing said hook through the loop and retracting it through the loop with the ends of the strings, said hook moving in the same rectilinear path on both its forward and rearward movements.

2. In a tag stringing machine, the combination of a chute through which apertured tags are adapted to be fed, devices for intermittently arresting the movement of said tags, means for inserting looped strings through the apertures of the tags, a hook having a non-flexible barb and arranged to pass through said loops and engage the free ends of the string, means for advancing and returning said hook to draw the free ends of the string through the loop and effect the tying operation, said hook moving in the same rectilinear path on both its forward and rearward movements, means for retaining the ends of the string, and means for positively moving the tags after the ends of the string have been pulled through the loop.

3. The combination in a tag stringing machine, of a chute to which the tags are adapted to be fed, string feeding means, means for cutting the string, means for looping said string through the eye of a tag, a hook having a non-flexible barb and arranged to pass through said loop and engage the free ends of the string, and means for moving said hook forwardly and rearwardly in the same rectilinear path to effect the tying of the string.

4. The combination in a tag stringing machine, of a chute to which apertured tags are adapted to be fed, means for looping string through the apertures of the same, a hook having a non-flexible barb and arranged to pass through said loop in both directions to engage and pull the free ends of the string through the loop, means for moving said hook forwardly and rearwardly in the same rectilinear path to effect the tying operation, means for retaining the ends of the string, and means for moving the tags to draw the loop taut against the same.

5. The combination in a tag stringing machine, of a chute to which apertured tags are adapted to be fed, devices for positioning such tags, string feeding and cutting mechanism, means for looping and passing the string through the apertures of the tags, a hook having a non-flexible barb and arranged to pass through said loop and engage and pull the free ends of the string through the loop, means for moving said hook forwardly and rearwardly in the same rectilinear path to effect the tying operation, means for retaining the ends of the string, and means for moving the tags to draw the loop taut against the same.

6. In a tag stringing machine, the combination of a chute through which apertured tags are adapted to be fed, devices for positioning the tags, string feeding and cutting mechanism, means for looping and passing the string through the apertures of the tags, a hook having a non-flexible barb and arranged to pass through said loop and engage the free ends of the string, and means for moving said hook forwardly and rearwardly in the same rectilinear path to effect the tying of the string.

7. In a tag stringing machine, the combination of a chute to which the tags are adapted to be fed, devices for positioning the tags, string feeding mechanism, mechanism for cutting said string into suitable lengths, means for looping and passing the looped end of the string through the aperture of the tag, a hook having a non-flexible barb and arranged to pass through said loop and engage the free ends of the string, means for moving said hook forwardly and rearwardly in the same rectilinear path to effect the tying of the string, and means for imparting tension to the free ends of the string and advancing the tag whereby the loop will be drawn taut against the tag.

8. In a tag stringing machine, the combination of mechanism for positioning the tags, string feeding and cutting mechanism, means for passing the looped end of the string through the aperture of the tags, means for spreading said loop, a hook having a non-flexible barb and arranged to pass through said loop and engage the free ends of the string, and means for moving said hook forwardly and rearwardly in the same rectilinear path through said loop to engage and draw the string ends through the same.

9. In a tag stringing machine, the combination of mechanism for positioning the tags, string feeding and cutting mechanism, a needle for passing the looped end of the string through the aperture of the tags, fingers to engage said loop and spread the same, a hook having a non-flexible barb and adapted to pass through the said loop, and means for moving said hook forwardly and rearwardly through the loop in the same rectilinear path to engage and draw the string ends through the same.

10. In a tag stringing machine, the combination of mechanism for positioning the tags, string feeding mechanism comprising laterally movable clamping jaws, means for operating said clamping jaws, means for cutting said string in the proper lengths, means for passing the string through the apertures of the tags to form a loop, means for spreading said loop, a hook having a non-flexible barb and arranged to pass in the opposite direction through the loop, and means for moving said hook forwardly and rearwardly through the loop in the same rectilinear path to engage and draw the string ends through the same.

11. In a tag stringing machine, the combination of mechanism for positioning the tags, string feeding and cutting mechanism, a needle having a notched end and adapted to pass through the hole in the tags with a looped end of the string, a hook arranged to pass in the opposite direction through said loop, fingers co-acting with said needle to open the loop, a presser foot having a forked end adapted to engage the tag near its aperture during the stringing operation, actuating means for said presser foot, and means for moving said hook forwardly and rearwardly in the same rectilinear path to draw the free ends of the string through the loop.

12. In a tag stringing machine, the combination of mechanism for positioning the tag, string feeding and cutting mechanism, a needle arranged to pass a looped end of the string through the hole in the tags, fingers co-acting with the needle to open the loop, a presser foot movably mounted and adapted to engage a tag near the aperture during the stringing operation, means carried by said presser foot for preventing the string passing from said fingers, a hook arranged to pass through the loop and engage the free ends of the string, means for moving said hook forwardly and rearwardly through the hook in the same longitudinal path to engage and draw the free ends of the string through the same, and means for advancing the tag and holding the string whereby the looped portion of the latter will be caught tightly against said tag.

13. In a tag stringing machine, a string feeding mechanism comprising two sets of clamping jaws carrying the string to the point of use, means for moving and actuating said jaws, cutting mechanism for the string, a needle to engage the string and pass it looped through the aperture of the tags, means for moving said needle into engagement with the string simultaneously with the cutting of the same, means for returning said needle to its normal position after the string has been passed through the aperture of the tag, a hook having a non-flexible barb and adapted to pass through the loop and engage the ends of the string, means for moving said hook forwardly and rearwardly in the same rectilinear path, and means for advancing the tags whereby they are moved away from stringing position and the looped string tightened against the end of the tag.

14. In a tag stringing machine, the combination of mechanism for positioning apertured tags, string feeding mechanism, a pair of rolls, a finger carried by one of said rolls and having projections for supporting the tags, means for looping and tying said tags, said means including a hook having a non-flexible barb and adapted to be moved forwardly and rearwardly in the same rectilinear path, means for holding the free end of the string and means for moving said rolls whereby the tags may be carried away from stringing position and the looped string pulled taut against the end of the tag.

15. In a tag stringing machine, the combination of mechanism for positioning apertured tags, means for looping and passing the string through the same comprising a horizontally movable needle, actuating means for said needle, means for tying the string comprising a hook having a non-flexible barb and adapted to pass through the loop to engage and draw the free ends of the string through the same, and means for moving said hook forwardly and rearwardly in the same rectilinear path.

16. In a tag stringing machine, the combination of mechanism for positioning apertured tags, string feeding mechanism, a needle for passing said string through the apertures of the tag, means for operating said needle to form a loop, means for disengaging the looped end of the string from the needle, a hook having a non-flexible barb and arranged to pass through said looped end, and means for moving said hook forwardly and rearwardly through said hook in the same rectilinear path to engage and draw through the free ends of the string whereby the tying operation may be effected.

17. In a tag stringing machine, the combination of mechanism for positioning apertured tags, means for feeding string into position to be passed through the aperture of the tag, a needle for engaging said string and forming a loop in the same, means for advancing and retracting the needle, a hook having a non-flexible barb and for entering the loop as the needle is retracted, and means for moving said hook forwardly and rearwardly in the same rectilinear path to engage and draw the free ends of the string through the loop.

18. In a tag stringing machine, the combination of tag positioning mechanism, string feeding and cutting mechanism, a needle adapted to pass through the hole of the tag and push a looped end of string through the same, actuating means for said needle, means for engaging said looped end, a hook having a non-flexible barb and arranged to pass through said loop, and means for moving said hook forwardly and rearwardly in the same rectilinear path to engage the free ends of the string and draw them through the loop.

19. In a tag stringing machine, the combination of tag positioning mechanism, string feeding mechanism comprising two sets of jaws carrying the string, cutting mechanism for severing the string, actuating means for said cutting mechanism, a needle to engage the string and pass it looped through the aperture of the tags, means for moving said needle into engagement with the string simultaneously with the severing of the same, a presser foot movably mounted and engaging a tag near its aperture, a hook carried by said presser foot, means co-acting with said hook for forming the loop, means for automatically returning said needle to normal position, a second hook adapted to pass through said loop, and means for moving said second hook forwardly and rearwardly in the same longitudinal path to effect the tying of the string.

20. In a tag stringing machine, the combination of a chute to which apertured tags are adapted to be fed, a rock shaft, actuating means therefor, an arm mounted thereon, the lower end of said arm forming a presser foot for holding a tag during the stringing operation, means for looping string through the apertures of the tags, a hook co-acting with said means for tying the string, and means for passing said hook through the loop and retracting it through the loop with the ends of the strings, said hook moving in the same longitudinal path on both its forward and rearward movements.

21. In a tag stringing machine, a chute to which apertured tags are adapted to be fed, a stationary bar closing the rear portion of said chute, a rock shaft, actuating means therefor, an arm mounted on said rock shaft, and having its lower end deflected to form a presser foot co-acting with said bar, said presser foot having a forked end adapted to hold the upper end of the tag against said bar during the stringing operation. means for looping strings through the apertures of the tags, a hook co-acting with said arm for effecting the tying of the strings, and means for passing said hook through the loop and retracting it through the loop with the ends of the strings, said hook moving in the same longitudinal path on both its forward and rearward movements.

22. In a tag stringing machine, the combination of a chute to which apertured tags are adapted to be fed, a stationary bar forming a portion of one of the walls of said chute, a rock shaft suitably supported, actuating means therefor, an arm adjustably mounted on said rock shaft and having its lower end deflected to form a presser foot co-acting with said bar to hold a tag during the stringing operation, a hook carried by said presser foot, means for passing the looped end of the string through the apertures of the tags, fingers co-acting with said hook to engage said loop and spread the same, a tying hook adapted to pass through the loop thus formed, and means for moving said tying hook forwardly and rearwardly through the loop in the same longitudinal path to engage and draw the string ends through the same.

23. In a tag stringing machine, the combination of a chute adapted to receive apertured tags, a stationary bar forming a portion of a wall of said chute, a rock shaft suitably supported, actuating means therefor, an arm adjustably mounted on said shaft and having its lower end forming a forked presser foot co-acting with said bar to hold a tag during the stringing operation, a hook carried by said bar, means for looping the string through the aperture of a tag, a plurality of fingers co-acting with said hook to spread the loop, a tying hook adapted to pass through the loop and engage the ends of the string, means for moving said tying hook forwardly and rearwardly in the same longitudinal path and draw the ends of the string through the loop, feeding mechanism for the tags, and a lever movably mounted and adapted to prevent movement of the ends of the string for a predetermined interval during the feeding of a tag.

24. In a tag stringing machine, string cutting mechanism, comprising a rock shaft suitably mounted, a lever thereon, a bar carried by said lever and longitudinally adjustable with respect thereto, a fixed blade carried by said bar, a movable blade co-acting with the fixed blade and carried by said bar, yielding means for maintaining the movable blade in inoperative position, a member fixedly mounted and co-acting with said movable blade to actuate the latter on the movement of said rock shaft, and actuating means for said rock shaft.

25. In a tag stringing machine, string cutting mechanism, comprising a rock shaft suitably supported, a lever adjustably mounted on said rock shaft, a bar longitudinally adjustable on said lever, said bar having a fixed blade integral therewith, a blade movably mounted on said bar and having a plurality of extensions, a spring carried by said bar and engaging one of said extensions to maintain the movable blade in normal position, a member fixedly supported and co-acting with the other of said extensions to actuate the movable blade, and means for rocking said shaft.

26. In a tag stringing machine, a rock shaft suitably supported, a fixed and a movable blade carried thereby, a stationary member co-acting with the movable blade to actuate the same, a lever pivotally supported, a lever mounted on said rock shaft, a connection secured to said levers, means for varying the length of said connection, yielding means for normally maintaining said levers in their lowermost position, and means for raising and lowering said levers to actuate said rock shaft.

27. In a tag stringing machine, a cutting mechanism comprising a rock shaft suitably supported, a fixed blade and a movable blade carried thereby, a stationary member co-acting with the movable blade to actuate the latter, a lever mounted on said rock shaft, a second lever having one end pivotally supported, a rod connecting said levers, means for adjusting the length of said rod, a roller carried by said second lever, a cam co-acting with said roller, actuating means for said cam, and yielding means for maintaining said roller always in engagement with said cam.

28. In a tag stringing machine, two sets of clamping jaws, the upper jaw of one set having an opening therethrough for the string, the lower jaw having an extension, a bar pivotally supported and controlling said extension, a latch pivotally supported and adapted to interlock with said bar, a spring for moving said latch toward said bar, means for raising and lowering said bar to open and close the clamping jaws of one set, means for opening and closing at a proper time the jaws of the other set, and means for feeding the two sets of clamping jaws toward and away from each other.

29. In a tag stringing machine, two sets of clamping jaws movably mounted, means for moving said jaws toward and away from each other, one of the jaws of one set having an opening therethrough for the string, the other jaw of the said set having an extension, a bar co-acting with said extension to open the jaw connected therewith, a latch pivotally supported and having a shoulder for interlocking said bar, a spring for moving said latch toward said bar, a rod connected with said bar, a lever pivotally supported and on which said rod is adjustably mounted, cam means co-acting with said lever to actuate said rod, and means for opening the other set of jaws when in their forward and rearward positions.

30. In a tag stringing machine, two sets of clamping jaws movably mounted, one of said sets comprising a fixed jaw having an opening therethrough for the string, a movable jaw having an extension therefrom, a bar co-acting with said extension for actuating the movable jaw, a tension device for the movable jaw, a latch adapted to interlock with said bar, a rod secured to said bar, a lever pivotally supported and on which said rod is longitudinally adjustable, cam means for actuating said lever, a spring for maintaining the jaws of the other set normally closed, pawls pivotally supported for automatically opening said jaws, means for moving said jaws toward and away from each other, and means for opening the other set of jaws when it reaches the limit of its rearward movement.

31. In a tag stringing machine, a chute adapted to receive apertured tags, means for positioning a tag in said chute, a longitudinally movable needle for passing the string through an aperture in a tag, a member secured to said needle, a bell crank lever suitably mounted and connected with said member, a bar connected with said bell crank lever, a roller on said bar, a cam co-acting with said roller to reciprocate said needle, fingers movably mounted for temporarily holding the loop, a hook having a non-flexible barb and adapted to pass through the loop and engage the ends of the string and means for moving said hook forwardly and rearwardly in the same rectilinear path to draw the ends of the string through the loop.

32. In a tag stringing machine, a chute adapted to receive apertured tags, means for positioning a tag in said chute, a longitudinally movable needle for passing the string through the aperture of the tag, means for positively advancing said needle and returning the same to normal position, a hook having a non-flexible barb and adapted to pass through the loop and draw the ends of the string through the same, said hook moving forwardly and rearwardly in the same rectilinear path, a lever connected with said hook, a bell crank lever suitably fulcrumed and connected with said lever, a rock shaft suitably mounted, a lever thereon operatively connected with said bell crank lever, a lever mounted on said rock shaft, a roller carried by the last mentioned lever, and a cam co-acting with said roller to reciprocate said hook.

33. In a tag stringing machine, a chute adapted to receive apertured tags, means for positioning a tag, a needle for passing a loop of string through the aperture of a tag, a lever operatively connected with said needle to positively advance and return the latter, a roller on said lever, a cam co-acting with said roller to actuate its lever, a loop retaining device, a hook having a non-flexible barb and adapted to be advanced and reciprocated in the same rectilinear path and to pass through said loop to draw the ends of the string therethrough, a lever operatively connected with said hook to positively advance and reciprocate the same, a rock shaft on which said last mentioned lever is mounted, and a cam for rocking said shaft.

34. In a tag stringing machine, a driven shaft, brake mechanism therefor, a chute to which apertured tags are adapted to be fed, positioning means for the tag controlled by said shaft, string feeding mechanism, means for passing a looped end of string through the aperture of a tag, a hook having a non-flexible barb and adapted to pass through the loop of string and draw the ends of the string therethrough, and means for moving said hook forwardly and rearwardly in the same rectilinear path, all of said means being controlled by said shaft.

35. In a tag stringing machine, a string cutting mechanism comprising a rock shaft suitably mounted, a lever adjustably mounted thereon and having slots therein, a bar having slots therein, fastening devices engaging the slots in the bar and lever for longitudinally adjusting the lever with respect to said bar, said bar having a cutting blade integral therewith, a movable cutting blade pivotally supported on said bar and having a plurality of extensions a stationary member co-acting with one of said extensions to actuate the movable blade, a stop on said bar co-acting with the other of said extensions, a spring co-acting with one of said extensions to maintain said movable blade in inoperative position, a second rock shaft operatively connected with said first rock shaft, a longitudinally adjustable connection secured to said second rock shaft, and a cam for operating said connection.

36. In a tag stringing machine, the combination of a chute adapted to receive apertured tags, means for positioning the tags in said chute, means for looping string through apertures of the tags, means including a hook having a non-flexible barb and moving in the same rectilinear path on its forward and rearward movement for tying the string, a discharge chute movably mounted, feed rollers carried by said chute and co-acting with the tag after the same has been strung, and means for adjusting the position of said discharge chute.

37. In a tag stringing machine, the combination of a chute adapted to receive apertured tags, means for positioning the tags in said chute, means for passing the string through the apertures in the tags, said means including a hook having a non-flexible barb and adapted to be advanced and returned in the same rectilinear path for tying the string, a discharge chute, feeding rollers thereon to which the tags are fed before the completion of the stringing operation, a rod carried by said chute, and a link pivotally supported and to which said rod is adjustably secured.

38. In a tag stringing machine, the combination of a casing, a chute thereon adapted to receive apertured tags, means for positioning tags in said chute, means for passing looped string through the aperture of the tags, means including a hook having a non-flexible barb and adapted to be advanced and returned in the same rectilinear path for tying the string, a discharge chute pivotally mounted, feed rollers thereon to which the tags are passed during the tying operation, an arm adjustably secured to said discharge chute, and means for adjustably securing said arm to said casing.

HARRY L. ROTH.

Witnesses:
H. S. FAIRBANKS,
C. D. McVAY.